(No Model.)
C. A. TAYLOR.
SQUARE AND ATTACHMENT THEREFOR.
No. 538,051. Patented Apr. 23, 1895.
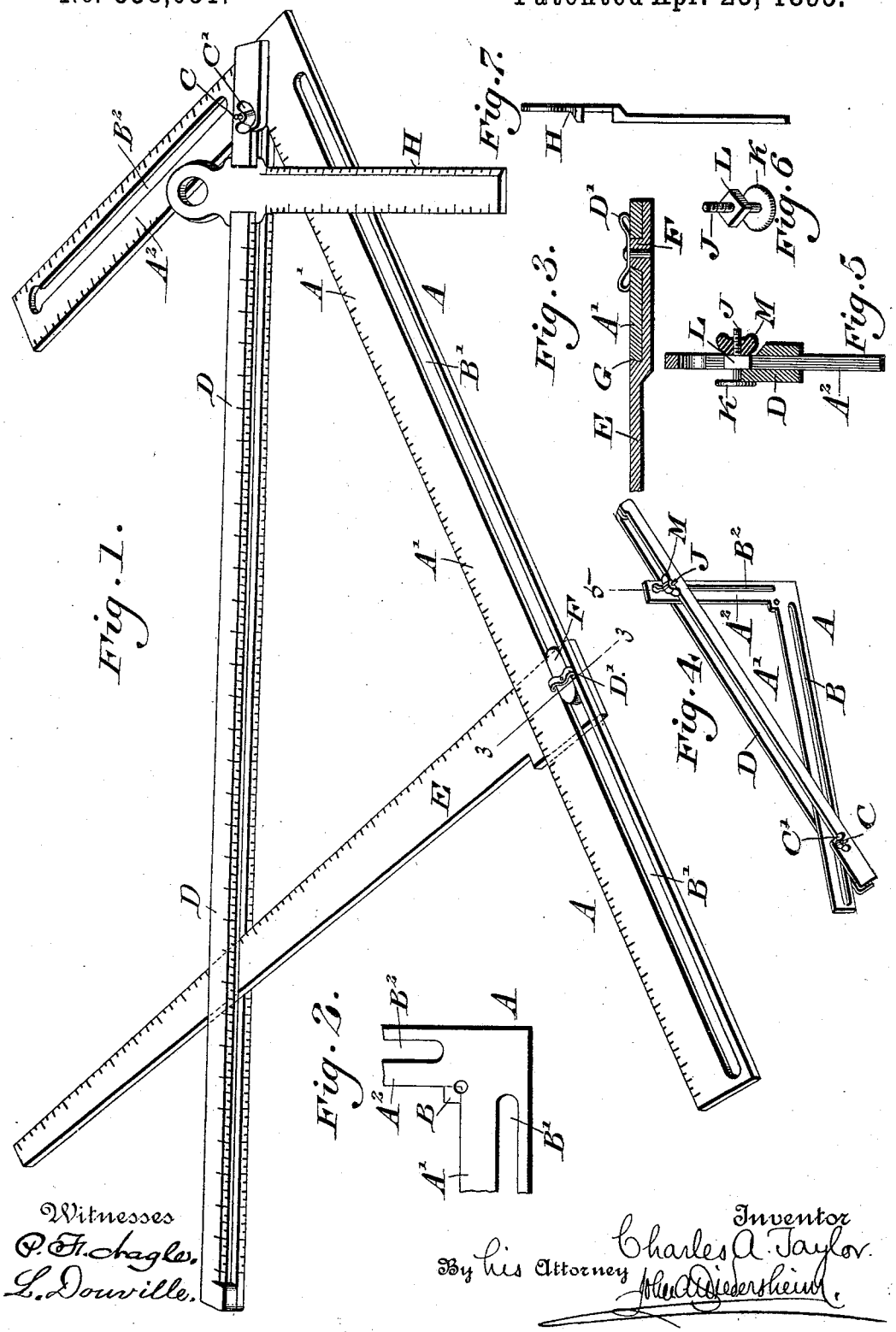

UNITED STATES PATENT OFFICE.

CHARLES A. TAYLOR, OF PHILADELPHIA, PENNSYLVANIA.

SQUARE AND ATTACHMENT THEREFOR.

SPECIFICATION forming part of Letters Patent No. 538,051, dated April 23, 1895.

Application filed September 12, 1894. Serial No. 522,797. (No model.)

*To all whom it may concern:*

Be it known that I, CHARLES A. TAYLOR, a citizen of the United States, residing in the city and county of Philadelphia, State of Pennsylvania, have invented a new and useful Improvement in Squares and Attachments Therefor, which improvement is fully set forth in the following specification and accompanying drawings.

My invention consists of a square and attachment for determining the various angles and cuts in forming rafters, the lengths of timbers, &c., and the bearing timbers for stairs as will be hereinafter set forth.

Figure 1 represents a perspective view of a device embodying my invention. Fig. 2 represents a top view of a portion of the square showing the projection at its inner angle. Fig. 3 represents a horizontal section on the line 3—3 Fig. 1, on an enlarged scale. Fig. 4 represents a perspective view of the device on a smaller scale with the parts in different position. Fig. 5 represents a vertical section on line 5 Fig. 4, on an enlarged scale. Fig. 6 represents a perspective view of the fastening device. Fig. 7 represents a partial side elevation of the slip scale employed.

Similar letters of reference indicate corresponding parts in the several figures.

Referring to the drawings: A designates a square which has a slot B' in the blade A' and the slot B² in the tongue A², and has a projection B at its inner angle through which passes the screw C on which the swinging scale D is mounted, the nut C' on the screw C locking the parts in position. The center of the screw is exactly at the angle of the square, and on a line with the inner sides thereof, which latter are graduated. The scale D which has a beveled edge, graduated similar to the square A, is formed of two parallel blades which are separated equal to the thickness of the square, and both ends of the upper blade are widened to strengthen the same. The screw C passes up through the blades of the swinging scale D and the projection B and has the thumb nut C' thereon whereby the scale D may be held firmly against the square A.

The inner edge of the square is beveled, as is the edge of the slot B' toward said inner edge of the square A, as shown in Fig. 3.

E designates a sliding scale which has a flanged end on which is a lug F the inner side of which is beveled and said lug is adapted to fit in the slot B' of the square A.

The beveled shoulder G of the flanged end is adapted to fit against the inner edge of the square and move thereon and with the lug F forms a joint with the square A. A revolving catch D' is pivoted to the lug F and when the latter is in position the spring catch is turned and it embraces the sides of the square A and thus the sliding scale E is locked.

H designates a slip scale which has a seat on the swinging scale and is adapted to move on said scale, it being provided with graduations corresponding to those of the other parts of the device and rests on either the blade A' or the tongue A²; the said scale H being used to assist in determining the amount to be taken from the length of a jack rafter so that it will stand correctly, for when work is done from a line in the center of the hip rafter and also from the center of the jack rafter, there is half the thickness of the hip rafter on a level line of the bevel, to be subtracted from the length of each jack, so that, when nailed to the side of the hip rafter, the jack will stand in its proper position on the wall plate.

J designates a pin with a head K and the squared part L, said squared part being adapted to move in the slot B², and said head to engage one end of the swinging scale (as shown in Fig. 4) when the square and swinging scale D is in position to determine the bearing timbers for stairs. A nut M secures said pin J in position binding said head against one side of the swinging scale.

The operation is as follows: For laying off a plain roof, note one-half of the width of the building on the blade A' of the square, and move the sliding scale to that point and clamp it. Note the rise of the roof on the sliding scale E, and bring the scale D to that point and clamp it. The length of the rafter is found on said scale D at its intersection with the scale E. Then place the instrument with the back of the scale D against a straight edged board and trace the plumb bevel by the tongue A² of the square A. With the face of the scale D against the board, trace the heel bevel by the blade A' of the square A.

When used in a hip roof on a square building, the operation is as follows: Note half the width of the building on the blade of the square A, and secure the scale E at that point. Note the same distance on the scale E, and bring the scale D to that point, and secure it. The distance on the scale D to the intersection is the run of the hip rafter. To find the length and bevels of the hip rafter, note the plan or run of the blade of the square A, sum up the rise of the roof on the scale E, bring the scale D to that point, and the length of the hip rafter is found on said scale D. The bevels are found the same as in common rafters.

To obtain the jack rafters, note half the width of the building on the blade of the square, and secure the scale E at that point. Note the rise of the roof on the scale E, and find the length of the common rafter on the scale D. Note this length on the scale E, and bring the scale to that point. A triangle has been formed on the instrument, showing the size and shape of one-half of one side of the hip roof in which the base equals the wall plate, the perpendicular equals the common rafter, and the hypotenuse equals the hip rafter. Obtain the side bevel of the jacks by placing the back of the scale D against a straight edge and tracing the bevel of the tongue of square. The plumb level is the same as the common rafter. The lengths of the jack rafters are formed thus—in the triangle of the instrument, space off on the blade the distances of the jack rafters apart, and move the scale E along the blade of the square and find the lengths on the sliding scale at the points required. As the work is in a line in the center of the hip rafter and also from the center of the jack rafter, there is half the thickness of the hip rafter on a level line of the bevel to be subtracted from the length of each jack rafter, so that when nailed to the side of the hip rafter, it will stand in its proper position on the wall plate. It is necessary to obtain what is to be subtracted to do this. When the instrument stands in the position of plan or seat of the hip, place the slip scale against the scale D and crossing it near the angle of the square, and note half the thickness of the hip rafter on the slip, and where that point touches the edge of the blade of the square, note it and bring the scale E to that point and note the distance on said scale where it touches the scale D. Then place the instrument in position of the common rafter, note the distance last found, and place it on the blade of the square, bring the scale E to that point, and the distance on scale D is the amount to be subtracted.

To determine the horses or bearing-timbers for stairs, the sliding scale E is removed and the swinging scale D is taken from the angle of the square and the square is placed between the blades of the swinging scale and the screw C is passed through the blades of the swinging scale and the slot B' in the square and is engaged by the nut C'.

The pin J in the slot $A^2$ is now moved until the head K engages the swinging scale and the nut M locks the parts. A fence has now been formed for laying off the timber bearings. For example the pitch of the stairs requires a rise of six inches and a tread of twelve inches, place the edge of the swinging scale which is toward the angle of the square corresponding with the points 12 and 6 as noted on the graduated edges, and lock the parts. Apply the swinging scale to the edge of the timber from one end and make a twelve inch tread and a six inch rise on the other and so on, sliding the swinging scale along the edge and making the required number of rises and treads, the swinging scale thus forming the pitch of the stairs.

Having thus described my invention, what I claim as new, and desire to secure by Letters Patent, is—

1. A square having a swinging scale mounted at the angle thereof, a sliding scale on one of the limbs of said square, said swinging scale being formed of separate blades between which the limbs of the square and the sliding scale may enter and a shoulder on said sliding scale which holds the same at right angles with the limb of the square, against which it abuts, substantially as described.

2. A square having a swinging scale mounted thereon at the angle thereof, and a sliding scale fitted on one of the limbs of said square, said swinging scale being formed of separated blades, between which the limbs of the square and the sliding scale may enter, substantially as described.

3. A square, a swinging scale mounted thereon, at the angle thereof, a slot in the blade of said square and a sliding scale having a flanged end and a lug which is adapted to enter said slot in said square and a catch on said lug, substantially as described.

4. A square, a swinging scale mounted thereon, a slot in the blade of said square, the inner wall of said slot being beveled, and a sliding scale having a shoulder which abuts against the square, a lug on said sliding scale, which enters the slot, the inner edge of said lug being beveled, and a catch on said lug for engaging said square, substantially as described.

5. A square in combination with swinging and sliding scales, and the slip scale H seated and movable on said swinging scale, and passing over one limb of said square, substantially as described.

6. A square having a projection at its inner angle, a swinging scale formed of two sections connected with said square on said projection on and in line with the inner edge of the blades of the square and a sliding scale connected with one of the blades of the square and at right angles thereto and moving between the said sections of said swinging scale, said parts being combined substantially as described.

7. A square having a slotted tongue and blade, a swinging scale formed of upper and lower sections united at their ends, a sliding scale secured to the square and movable between said sections of the swinging scale, and a slip scale seated on said swinging scale at right angles thereto, and adapted to move over a limb of the said square, said parts being combined substantially as described.

8. A square having a swinging scale mounted at the angle thereof, and formed of two blades joined at their ends, a sliding scale on one of the limbs of said square, and means for securing said sliding scale, the latter being adapted to move between the blades of said swinging scale, substantially as described.

CHARLES A. TAYLOR.

Witnesses:
JOHN A. WIEDERSHEIM,
WM. C. WIEDERSHEIM.